Figure 1:
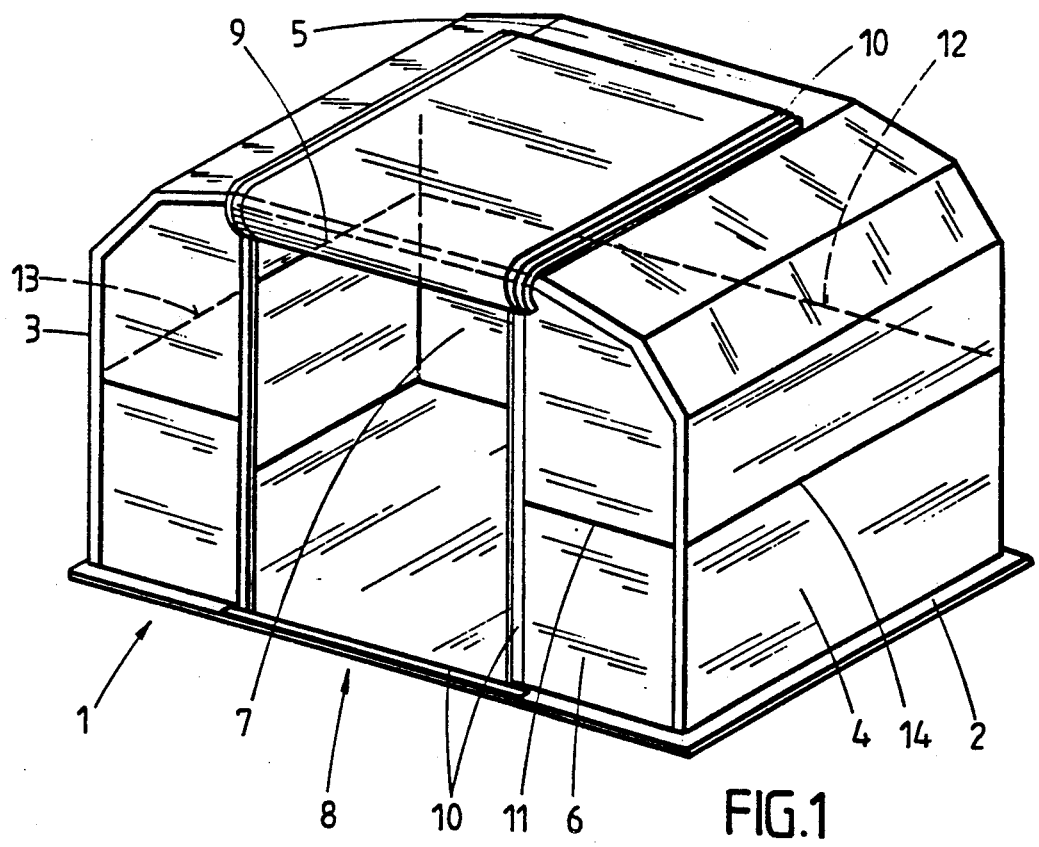

United States Patent [19]

Meier et al.

[11] Patent Number: 5,183,176
[45] Date of Patent: Feb. 2, 1993

[54] LINING FOR RECEPTACLES

[75] Inventors: Josef Meier, Borken; Gottfried Niehaus, Rhede-Vardingholt, both of Fed. Rep. of Germany

[73] Assignee: Meier & Niehaus GmbH, Rhebe, Fed. Rep. of Germany

[21] Appl. No.: 612,582

[22] Filed: Nov. 9, 1990

[30] Foreign Application Priority Data

Nov. 14, 1989 [DE] Fed. Rep. of Germany ... 8913412[U]

[51] Int. Cl.⁵ .................................. B65D 33/14
[52] U.S. Cl. ...................... 220/470; 220/450
[58] Field of Search ............ 220/450, 453, 452, 470

[56] References Cited

U.S. PATENT DOCUMENTS

| Re. 29,721 | 8/1978 | Ukmar et al. | 220/403 |
|---|---|---|---|
| 3,167,209 | 1/1965 | Jones | 220/403 |
| 3,438,562 | 4/1969 | Connor et al. | 220/403 |
| 3,814,275 | 6/1974 | Lemons | 220/450 |
| 3,972,467 | 8/1976 | Whillock et al. | 220/450 |
| 4,008,347 | 2/1977 | Amberg et al. | 220/453 |
| 4,323,620 | 4/1982 | Iwabuchi et al. | 220/452 |
| 4,444,821 | 4/1984 | Young et al. | 220/450 |
| 4,581,285 | 4/1986 | Mahefkey, Jr. | 220/450 |
| 4,692,132 | 9/1987 | Ikushima et al. | 220/450 |
| 4,823,981 | 4/1989 | Tonokowa et al. | 220/450 |
| 5,059,084 | 10/1991 | Krein | 220/403 |

Primary Examiner—Joseph Man-Fu Moy
Attorney, Agent, or Firm—Webb, Burden, Ziesenheim & Webb

[57] ABSTRACT

A lining for the thermal insulation of containers is disclosed, which lining is constituted by mats or sheets of insulating material, such as plastics, which can be placed against the inside walls of the container. The lining is a prefabricated collapsible or foldable three-dimensional hollow body which is formed by mat-like or sheet-like flexible, yet relatively stiff insulating material. A sealable opening is provided on one side of the hollow body.

4 Claims, 1 Drawing Sheet

LINING FOR RECEPTACLES

DESCRIPTION

The invention relates to a lining for receptacles such as containers for the thermal insulation thereof, which lining comprises mats or sheets of insulating material, such as plastics, which can be placed against the inside walls of a receptacle, or which lining is formed of such mats or sheets.

Containers, for example for air-freight purposes, must, for certain goods to be transported, occasionally be provided with a thermally insulating lining which is, however, not to remain permanently in the container, but is to be removed again after completion of a specific transportation routine and is then intended for repeated use.

For the purpose of lining containers, it is known to use sheets of insulating material which are rolled up for storage, with the result that they need to be rolled off when lining a container. The application of a lining comprising individual sheets of insulating material is complicated and time-consuming. The application of the insulating-material sheets in a container is, in particular, associated with much manual labour and is, therefore, expensive. In this regard, the lining of corner regions requires particular dexterity. A further drawback resides in that, when removing the lining, the individual sheets of insulating material must be detached from one another and must be rolled up again, in order to be available for subsequent use. When the individual sheets of insulating material are rolled up, it is frequently not possible to distinguish, when viewing the roll, at which point of a container the end of the respective sheet of insulating material belongs, although it is specifically in the field of air-freight that containers used have standardized shapes and dimensions such that a thermally insulating lining does not need to be adapted to individual container types and/or dimensions.

The object of the invention is to provide a lining for receptacles, such as containers, for the thermal insulation thereof, which lining is not only reusable, but can also be fitted and removed, quickly, accurately and with little manual labour.

According to the invention, this object is met by a lining of the kind mentioned at the outset and which is formed by a prefabricated collapsible or foldable three-dimensional hollow body of mat-like or sheet-like flexible, yet relatively stiff insulating material, which has a sealable opening on one side. Advantageous embodiments of the invention are set out in the subordinate claims.

The lining according to the invention is a three-dimensional prefabricated hollow body which is adapted to the inner contour of a receptacle, in particular a container intended for air-freight purposes, and which is composed or assembled of course-like insulating material in the form of mats or sheets, the side walls of the hollow body being collapsible or foldable, so that the hollow body, when the lining is not required, can be folded to be flat, and stored and transported in a compact manner.

The three-dimensional rigged hollow body forming the lining according to the invention is fully closed and has, solely on one side, a sealable opening through which access may be had to the rigged hollow body and through which it can be loaded and unloaded. A flap, which is secured in the closed position by surface fasteners, may be provided for the ultimate sealing of the collapsible hollow body. On the outside of the hollow body, adhesion members, such as specific glueing or adhesive points or regions, may be provided for the purpose of reliably maintaining the lining according to the invention in a container in the rigged position, yet these adhesive points should not have so great an adhesive force that they adversely affect the collapsing and removing of the lining.

The insulating material of the lining according to the invention preferably comprises a composite sheet having a core of cellular material. In this connection, the core of the composite sheet can be coated with a bonded material, such as polyethylene.

An insulating material of this kind has a good insulating effect, at relatively low layer thickness, is readily made up into the hollow body according to the invention since it can be bonded, and it has adequate rigidity to impart the three-dimensional hollow body, when folded out, with the desired stability. For folding purposes, the insulating material may be provided with previously made or predetermined bending points, for example impressed folding lines.

It is possible to fold up the lining according to the invention in a relatively small space and, once it has been placed in position in an opened container, to unfold it without difficulty and install it in the container. For this reason, appropriate linings can be brought on site when required, without the necessity of initially already installing them in a container. Indeed, the installation is possible immediately prior to the loading of the goods which are to be transported in thermally insulated manner. Upon completion of the specific transportation, the lining can be removed immediately and folded together flatly. Since these linings can be transported and stored compactly, it is economically justifiable to keep a central stock of such linings and, in each case, to bring them to the respective site at short notice for specific cases as required.

Figure 2:
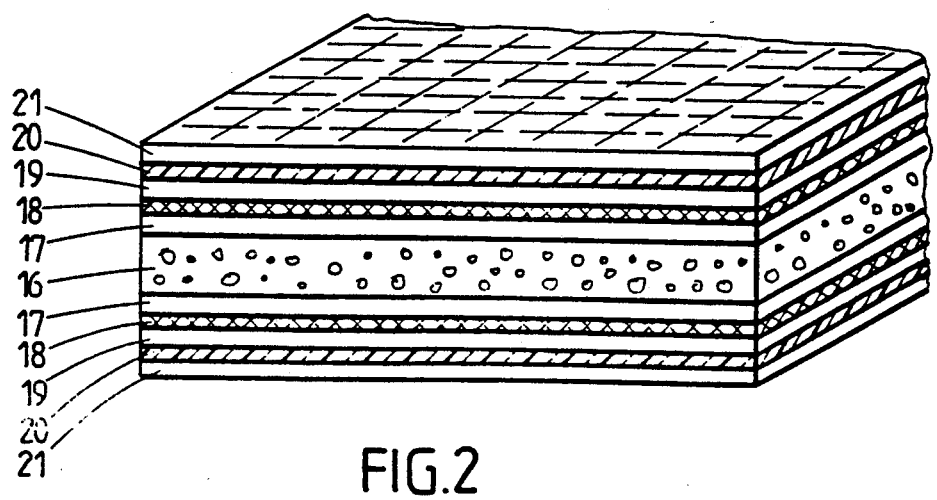

An exemplified embodiment of a lining according to the invention for air-freight containers is diagrammatically illustrated in the drawing, wherein FIG. 1 is a diagrammatic view of a lining for containers, designed as a three-dimensional hollow body, in rigged state, and FIG. 2 a cut-out of a composite sheet which is used to construct the three-dimensional hollow body which forms the lining.

The lining (1), which is designed as a three-dimensional collapsible or foldable hollow body, is adapted to the shape of a container, which is not illustrated and is used, for example, in air-freight transportation.

The lining (1) comprises a floor (2), side walls (3 and 4), a top (5), a front wall (6) and a rear wall (7).

The front wall (6) comprises an opening (8) which extends along its entire height and through which the lining (1) is loaded and unloaded. The opening (8) can be sealed by means of an upward-folding flap (9). At the sides of the opening (8), surface fasteners (10) are attached to the front wall (6) and to the edges of the flap (9) in order to maintain the flap (9) in the sealed position when it is brought out of the folded-back position shown in FIG. 1 and in front of the opening (8).

The floor (2), the side walls (3 and 4) and the top (5) are integrally composed of a composite sheet, it being possible to achieve this by welding together individual parts of the composite sheet. The front wall (6) and the rear wall (7) are also permanently secured, in particular by welding.

Bending folds (11 and 12) which are moulded into the front wall (6) and the rear wall (7) permit a collapsing of these walls for the purpose of a compact folding of the lining (1).

Corresponding bending folds (13 and 14) in the side walls (3 and 4) are provided, in order that these walls may also be folded compactly. If required, further bending folds may also be provided in the transition region between the side walls (3 and 4) and the top (5).

The entire lining, i.e. its individual portions, are preferably composed of a composite sheet, the structure of which can be found in more detail in FIG. 2, wherein the individual layers of the composite sheet (15) are shown on an enlarged scale and also not to scale, for the sake of greater clarity.

The composite sheet (15) comprises a core (16) of cellular material, preferably a relatively flexible open-cell cellular material. This core (16) is provided on both sides with coatings which impart a relatively high rigidity and stability to the composite sheet as a whole.

The coatings arranged on both sides of the core (16) consist of a sheet-lined polyethylene foil (17), a tissue layer (18), a further polyethylene foil (19), an aluminium foil (20) and, as the outermost covering, a third polyethylene foil (21). The various foils which are arranged on both sides of the core (16) are relatively thin, compared with the core, and take on the surface structure of the core (16), i.e. of the tissue layer (18), with the result that the composite sheet (15) does not, in general, have a smooth surface, as is shown in FIG. 2 for reason of simplified illustration.

Since the composite sheet (15) is of polyethylene at its surface, portions of the composite sheet 15) can be welded to each other, which is advantageous in regard to the connection of portions of the composite sheet (15) to form the three-dimensional lining (1). It is also possible to weld the members of the surface fasteners (10) on to the corresponding sheets.

The floor (2) of the hollow body is shown in FIG. 1 as having laterally projecting edges, in order to make the floor more visible. Under normal circumstances, however, the floor (2) terminates so as to be flush with the side walls (3 and 4), the front wall (6) and the rear wall (7).

The lining (I) which is diagrammatically illustrated in FIG. 1 is designed for a specially standardized air-freight container, namely for a container which forms part of the main deck of a cargo compartment on an aircraft. In respect of other container shapes or container types, linings having appropriate shapes are to be provided, without these differing, from a technical point of view, from the lining according to FIG. 1.

We claim:

1. A lining for a receptacle having a specific inner contour, wherein said lining comprises:
a prefabricated body conforming to said receptacle's inner contour, said body defining a hollow interior for being loaded with goods, said body having a sealable opening to provide access to said hollow interior for loading and unloading of said hollow interior, said body comprised of sheets of insulating material, with a bending fold provided in at least one of said insulating material sheets whereby said body may be folded to be flat, to provide for storage and transportation of said body in a compact manner, in which a flap which seals the opening and surface fasteners to hold the flap in the sealed position are provided in the region of the opening on the hollow body.

2. A lining for a receptacle having a specific inner contour, wherein said lining comprises:
a prefabricated body conforming to said receptacle's inner contour, said body defining a hollow interior for being loaded with goods, said body having a sealable opening to provide access to said hollow interior, said body comprised of sheets of insulating material, with a bending fold provided in at least one of said insulating material sheets whereby said body may be folded to be flat, to provide for storage and transportation of said body in a compact manner, wherein said insulating material sheets form a floor, a pair of side walls, a front wall, a top and a rear wall, including a bending fold molded into each of said side walls and said front wall and said rear wall, wherein a flap which seals said opening and surface fasteners to hold said flap in a sealed position are provided in the region of said opening on said body.

3. The lining of claim 2, wherein said slide fasteners are welded into position.

4. The lining of claim 3, wherein said receptacle is a standardized air freight container.

* * * * *